March 13, 1928.
E. T. SMITH
1,662,133
VALVE OPERATING MECHANISM
Filed June 5, 1923     3 Sheets-Sheet 1
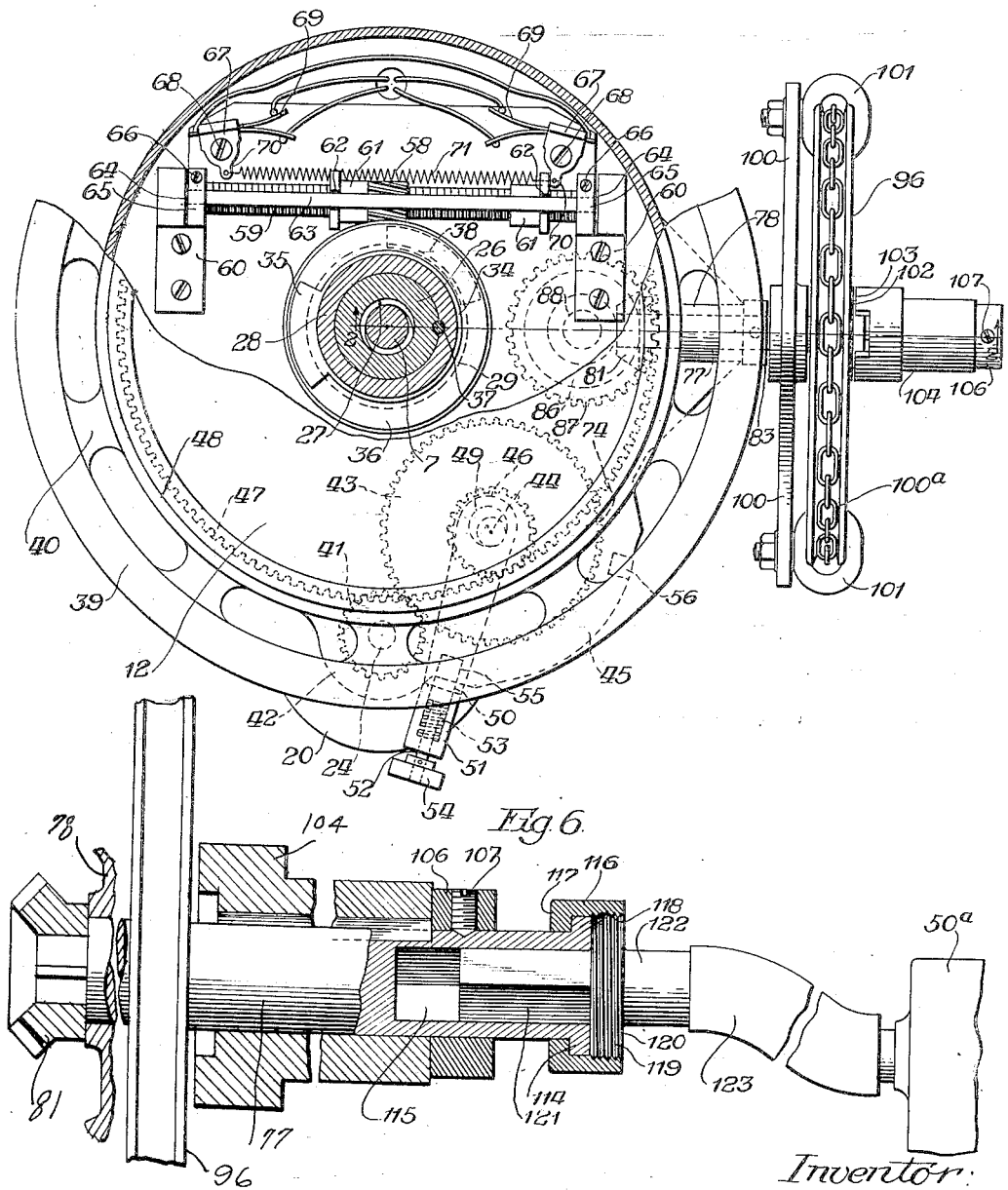

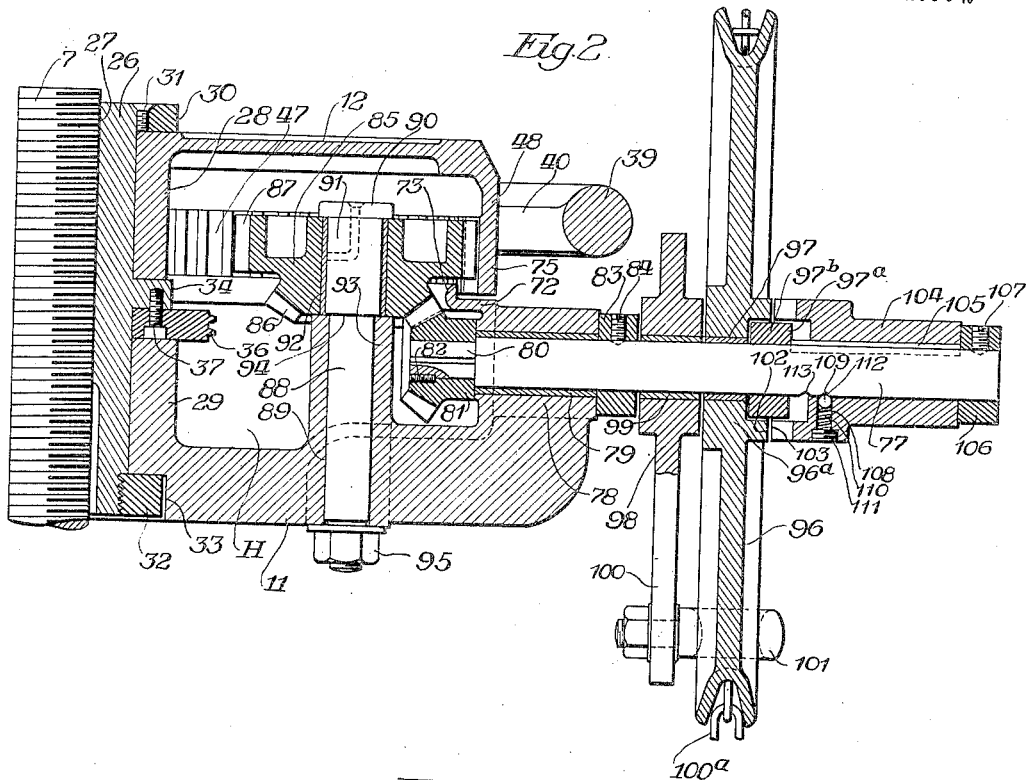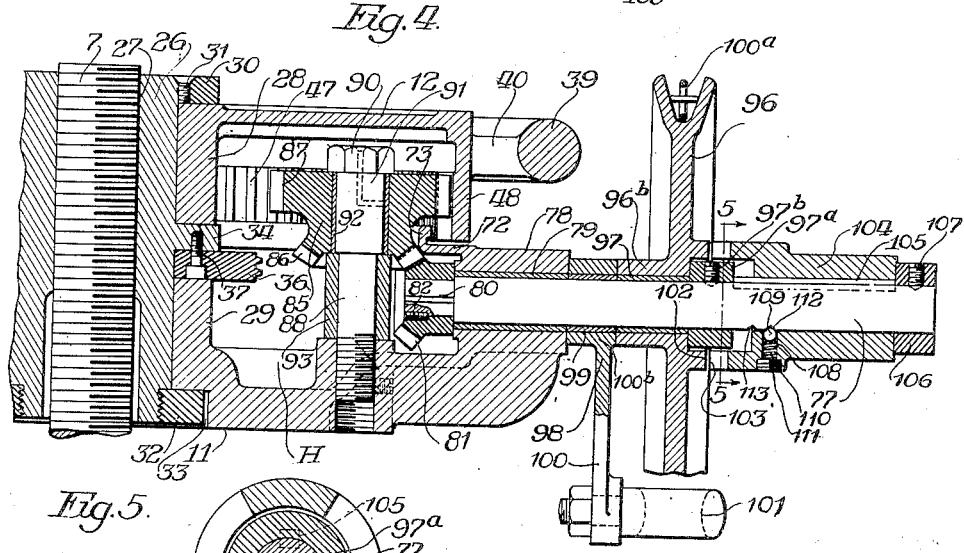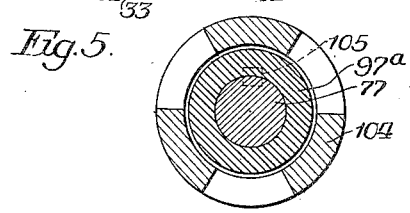

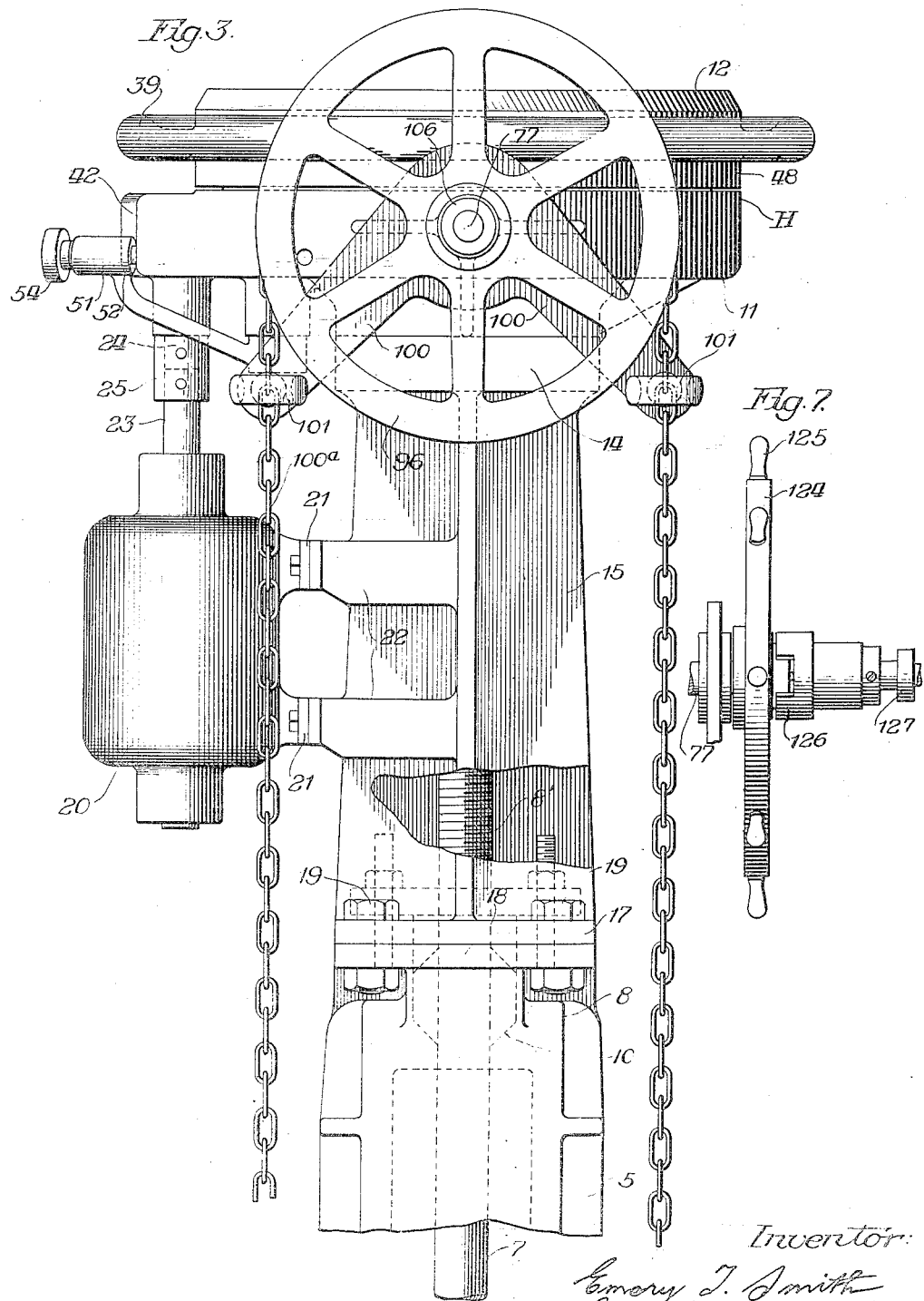

Patented Mar. 13, 1928.

1,662,133

UNITED STATES PATENT OFFICE.

EMORY T. SMITH, OF LUDLOW, MASSACHUSETTS, ASSIGNOR TO THE CHAPMAN VALVE MANUFACTURING COMPANY, OF INDIAN ORCHARD, MASSACHUSETTS, A CORPORATION OF MASSACHUSETTS.

VALVE-OPERATING MECHANISM.

Application filed June 5, 1923. Serial No. 643,534.

This invention relates to power transmission means, and more particularly to an improved means for operating valves, and the like.

While this invention is particularly adapted for use in operating valves and other devices to which a limited movement is to be given, and, as a matter of convenience in illustration, is shown as embodied in a structure for operating a valve, it will be understood that it has a wide field of utility for other purposes.

Among the more important objects and features of this invention are: the embodiment in a unit structure of means for operating various types, arrangements and sizes of valves and other mechanisms; the embodiment in a structure of means whereby the valve, or the like, may be operated manually or by other power; the arrangement of the manual and power actuated driving means wherein a motor, limit control means therefor, and manual means are all embodied in a structure which is compact, possesses strength and rigidity, and as a complete power transmission unit may be associated with any one of various types of valves, whether rotary or reciprocable without material modification of the valve or other structure; the complete housing of the power transmission mechanism to protect the same against damage and the operator against injury; the facility with which the various parts of the device may be reached for repair or replacement; the embodiment in a device of this character of an arrangement whereby assembly and disassembly of the parts may be quickly and facilely accomplished; and the novel means for operatively connecting the motor and transmission mechanism or for disconnecting the same, whereby the valve or other device may be manually operated when necessary or desirable independently of the motor and its associated driving elements.

Additional objects and features of utility and improvement reside in one of the embodiments of this invention illustrated and are: the provision, in combination with motion imparting mechanism, of a motor on the unit, and manual operating means, and an auxiliary manual operating means connected by reduction gearing with the motion imparting mechanism, so that the operator always has sufficient leverage available for operating the device manually; and the provision, in combination with the elements mentioned, of means, such as a clutch, for disconnecting the motor, and also a clutch for disconnecting the auxiliary manual operating means when the motor is operating the device. The auxiliary manual operating means also serves, in another embodiment illustrated, where the unit motor is omitted, as an avenue for connection of a portable power means, and, therefore, one of the further objects of this invention resides in the provision, in combination, of an element to be moved, mechanism, which may include reduction gearing, for moving said element, a portable source of power, manual operating means, and means for disconnectibly connecting either the manual operating means or the source of power to the mechanism for imparting motion to said element.

The term "portable" as employed by me in the specification is of broad meaning, and is intended to include any motor which may be conveniently moved from place to place, either by carrying same or by transporting on a truck or the like.

The foregoing, as well as such further objects and additional benefits and advantages as may hereinafter appear or be pointed out, I attain by means of a construction, embodiments of which are illustrated in the accompanying drawings wherein:

Figure 1 is a top plan view of the device of this invention;

Figure 2 is a transverse vertical sectional view taken on the plane of line 2—2 of Figure 1, looking in the direction indicated by the arrows;

Figure 3 is a side elevational view from the aspect of the right hand side of Figure 1;

Figure 4 is a sectional view similar to Figure 2 of an alternative construction;

Figure 5 is a detail sectional view taken on the line 5—5 of Figure 4;

Figure 6 is a detail sectional view of a modification, and

Figure 7 is a fragmentary elevational view of a further modified form of this invention.

Referring now in detail to the drawings, wherein this invention is embodied in a structure particularly adapted for operating valves, and is shown as applied to a valve of the well-known gate type, 5 is the valve casing, this casing having the usual port across which is slidable the blade of the valve (not shown), this valve being carried on one end of an operating member, such as a valve stem 7, which extends upwardly through the center of the valve casing 5 into and through the top of the head 8 of said casing. The valve stem 7 extends through a fluid tight packing gasket 10 mounted in the top of the head 8 and is provided with a threaded portion 8' beyond the head 8.

The structure so far described is that usually embodied in any sliding gate valve, and, as previously pointed out, one of the objects of the invention is to mount the valve operating device as a unit upon the valve casing and to afford means for opening and closing the valve, either manually or by means of a motor. To this end the structure to be described hereinafter has been designed.

As shown generally in Figures 2 and 3, this invention includes a housing H, comprising the lower portion 11, and the upper portion 12, said housing containing the power transmission gearing and associated mechanism to be described presently. The lower portion 11 is bolted or otherwise fixedly mounted to the head 14 on the standard comprising the legs 15.

The legs 15 are provided with foot portions 17 which are of suitable breadth to engage evenly the upper surface of the platform 18 usually cast integrally with the head 8, suitable bolts 19—19 extending through the foot portions 17 into the platform 18 for fixedly connecting the standard comprising the legs to the valve casing. Thus the housing for the transmission gearing, to be presently described, is rigidly disposed on the valve casing.

The power operating means for the device of this invention is preferably an electric motor 20, the casing of which is provided with feet 21—21 for securement to lugs 22—22 formed in complemental pairs on the legs 15 so as to support the motor directly upon the legs about midway of the length of the same. The motor shaft 23 extends parallel to the valve stem 7, but to one side of the housing H, said shaft 23 being connected to a shaft 24, which extends from the portion 11 of the housing, by means of a sleeve 25. Of course, any other suitable means may be provided for connecting the shafts 23 and 24.

Transmission gearing is contained in the housing H composed of the sections 11 and 12, the former section being fixedly mounted on the standard as explained, and the latter being rotatable and connected operatively with the threaded part 8' of the valve stem through a lost motion connection for imparting rectilinear movement thereto within certain limits. The connection between the section 12 of the housing and the threaded part of the valve stem preferably includes a sleeve 26 provided with an internally threaded bore 27 which engages the valve stem, the sleeve being separate from and rotatably mounted in a vertically extending axial hub 28, preferably cast integrally with the top section 12 of the housing. Thus the sleeve 26 is rotatable relative to the hub 28 through certain limits governed by the lost motion arrangement to be presently described.

The bottom portion 11 of the housing is provided with an upstanding axial hub 29 which extends to a point about midway of the sleeve 26, but in spaced relation to the lower end of the hub 28. The sleeve is freely rotatably mounted in the hub 29 and is retained against longitudinal movement in either of the hubs 28 and 29 by means of a collar 30 which encircles the upper projecting end of the sleeve and is secured thereto by key screws 31, and a second collar 32 which is threaded to the lower end of the sleeve and lies in an annular recess 33 formed in the base of the portion 11.

Between the adjacent ends of the hubs 28 and 29 a laterally extending annular flange 34 is provided, having a segmental lug 35 formed integrally therewith and with the sleeve 26. A worm 36 is secured to the flange 34 by means of screws 37, said worm lying between the upper end of the hub 29 and said flange 34, and performing a function which will presently appear. The lower end of the hub 28 is provided with a segmental lug 38, shown in dotted lines in Figure 1, and arranged in the plane of the lug 35, these lugs or abutments being adapted to engage, when motion is imparted to the upper section 12 of the housing, either manually or by the power transmission gearing from the motor as will appear presently.

To the end that the necessary rotary motion may be manually imparted to the upper section 12 of the housing, the latter is provided with a hand wheel 39 integrally cast with the upper section 12 through the medium of webs 40.

The transmission gearing which comes into play when the motor is used preferably comprises a pinion 41 mounted on the upper end of the stub-shaft 24 within an enlarged chamber 42 formed integrally with the bottom section 11, this pinion 41 being adapted for meshing engagement with a relatively large gear 43 mounted upon a laterally shiftable shaft 44, another enlarged segmental chamber 45 being formed on the section 11 to accommodate said gear 43. The shaft 44 carries on its upper end a pinion 46 which is adapted for meshing engagement with the internal ring-teeth 47 formed on the wall 48 of the upper section 12 of the housing 8. The shiftable shaft 44 is in the nature of a trunnion and is eccentrically mounted upon a bearing stud 49 which extends through a bearing in the bottom wall of the lower section 11, this stud being eccentric to the shaft 44 but concentric with the segmental face of the chamber and receiving on the lower free end a lever arm 50. The free end of the lever 50 is provided with an upstanding lug 51 which is bored to receive a locking plunger 52, this locking plunger being restrained against outward movement by a helical spring 53 which surrounds the plunger, the plunger carrying a knob 54 by which the means may be withdrawn from engagement with one or the other of the apertures 55 and 56 formed in the segmental wall of the chamber 45. Thus by shifting the lever arm from one position to another, the pinion 46 may be engaged and disengaged with the teeth 47. In this manner the motor may be readily disconnected from the rotatable part of the housing H when it is desired to manually operate the valve, or when the motor is disabled, it being seen that when the motor is driving, the shaft 24 is connected to the upper section 12 through the transmission gearing.

I provide means for controlling the motor circuit within certain limits, this means being operated by the worm 36 and comprising a worm gear 58 in meshing engagement with the worm and mounted upon the medial portion of the screw-rod 59 and rotatable therewith, which rod is mounted at its ends in bearings 60—60 carried by the base of the housing section 11. A pair of nut stops 61 are mounted upon and in threaded engagement with the rod 59, these nuts having each a plurality of notches 62 for receiving the guide-rod 63, this guide-rod preventing turning of said nuts and extending above and parallel with the screw-rod 59 and seating at its ends in recesses 64—64 formed in the upper faces of the bearings 60—60. As best shown in Figure 1, the guide-rod is retained against accidental displacement by flat spring strips 65—65 each having one free end riveted at 66 to the complemental supporting bearing thereof. A pair of blocks 67 are pivoted at 68 on an insulated base on the section 11, near the bearings 60, and pairs of circuit controlling elements 69 are carried by said blocks. The blocks have extensions 70—70 connected by a contractile helical spring 71, and said extensions are disposed in the path of movement of the respective stop nut therefor, so that when the nut for either of said circuit controllers strikes the same the motor circuit is broken. The relative positions of the nuts 61 on the screw-rod may be varied by releasing one end of the guide-rod 63 and rotating one or the other of the nuts on the screw-rod, and then returning the guide-rod to position.

The lower section 11 and the upper section 12 of the housing have a dust proof junction preferably comprising an annular horizontal flange 72 on the section 11 and an upturned flange 73, which latter lies within the wall 47 of the section 12 and cooperates therewith to prevent the entrance of foreign matter into the housing. The wall 48 of the upper section 12 is likewise provided with a depending annular flange 75 which lies outside the annular wall of the portion 11 to close the space between this wall and the wall 48. The flanges 72 and 73 are interrupted at 74 to permit the pinion 46 to engage the teeth 47 on the section 12.

The valve structure hereinabove described may be manually operated as explained by manipulation of the hand wheel 39, and, in addition to the latter, I provide an auxiliary manual operating means, which, in one embodiment, serves to afford a connection for operation by power, such as a portable motor.

The auxiliary manual operating means may comprise either the form shown in Figures 1 to 3, or that shown in Figure 4.

The structure disclosed in Figures 1 to 3 comprises a revoluble shaft 77, arranged radially and horizontally relative to the valve stem 7 in a bearing 78, formed in the vertical wall of the lower housing section 11. A suitable bushing 79 is provided in said bearing 78.

The inner end of the shaft 77 is reduced in cross-section as at 80, for the reception of a bevel pinion 81, said pinion being locked on the shaft 77 by the provision of a key and a screw 82. The pinion abuts the inner surface of the wall of the housing section 11, and a collar 83 locked by a screw 84 on the shaft 77, abuts the outer surface of said wall, said pinion and collar effectually preventing longitudinal displacement of the shaft 77.

Motion of the shaft 77 is imparted to the internal gear 47 and upper housing section, by the provision of a double gear element 85, including a bevel pinion 86, and a gear 87, the former meshing with the pinion 81, and the latter with the gear teeth 47. The gear element 85 is freely rotatable upon the vertical shaft 88, which is fixedly mounted in an opening 89 formed in the bottom of the lower section 11. The shaft 88 comprises a head 90, enlarged bearing part 91, carrying a bearing sleeve 92 for the gear element 85, and an apertured boss 93 surrounds the shaft 88, and engages the abutment 94 on said gear 85. A nut 95 threads onto the lower end of the shaft 88 and thus serves to bring the portion 91 into firm abutting engagement with the spacer 93.

The shaft 77 may be manually or power operated, and, to this end a sheave or chain wheel 96 is provided, the hub 96ª of said sheave being freely rotatable on the shaft by the provision of a bearing bushing 97, surrounding the shaft 77, said wheel being located at approximately the medial portion of the shaft and spaced from the collar 83. Outward longitudinal displacement of the wheel 96 is prevented by the provision of a collar 97ª, fixed by a screw 97ᵇ to the shaft 77. A yoke 98 forming a chain or belt guide is arranged between the sheave or chain wheel and the collar 83, a bushing 99 being provided for said chain guide. The chain guide may, as seen in Figure 3, include its hub portion and divergent arms 100—100, having each a guiding eye 101, said eyes being located with their axes in alignment with a line tangential to the periphery of the chain wheel.

I provide means for disconnectibly connecting the chain wheel to the shaft 77 for rotation therewith, such means conveniently including spaced clutch abutments 102—102 formed upon the outer surface of the hub of the chain wheel, and said abutments being arranged for engagement with complemental abutments 103—103 formed upon the clutch sleeve 104. The sleeve 104 is rotatable with and slidable upon the shaft 77, by the provision of a key or spline 105 engaging the sleeve and said shaft. A collar 106 affixed by a screw 107 to the outer end of the shaft 77, prevents displacement and limits outward movement of the clutch sleeve.

The clutch sleeve 104 is provided with an enlarged portion adjacent the clutch abutments 103 and in said enlargement a radial opening 108 is provided containing a ball 109 forced against the shaft 77 by a spring 110, said spring being retained by the provision of a screw plug 111. In the "out" position of the sleeve the ball 109 seats in a recess 112 in the shaft 77, and in the "in" position the ball seats in a recess 113 in said shaft, thus effectually retaining the clutch sleeve in either of its extreme limits of movement.

For manual operation of the device by means of the chain wheel 96, the clutch sleeve is slid inwardly until the abutments thereof engage the complemental abutments on the chain wheel, and then motion may be imparted to the chain wheel either by the provision of a belt or a chain 100ª which partly encircles said wheel and passes through the chain guide 101. It is obvious that when the device is operated by the chain wheel the motor on the standard 15 should be disconnected by moving the lever 50 to the proper position. Conversely when the device is operated by the motor the clutch sleeve 104 should be in the disengaged position so as to avoid rotating the chain wheel, and thus preventing damage to the apparatus.

It will also be observed that where desired the motor on the standard 15 may be omitted and a portable motor, shown at 50ª, may be connected by a belt to the sheave or chain wheel 96.

As an alternative means for operating the shaft 77 by a portable source of power, or as auxiliary means for operating the device by power in the event that the motor on the standard 15 should fail to function the modification shown in Figure 6 may be conveniently associated with the shaft 77.

Referring to Figure 6, it will be observed that the outer end of the shaft 77 is provided with an external annular flange 114 and a longitudinal polygonal recess 115. A collar 116 is carried by the shaft and freely rotatable thereon, said collar having an inwardly directed flange 117 which prevents removal of the collar by abutting the flange 114. The collar is internally threaded at 118 for engagement with threads 119 formed on the annular enlargement 120, which latter forms an integral part of the polygonal plug member 121, said plug member having an axial extension 122 for connection with a flexible shaft 123. The flexible shaft 123 is connected to and forms a part of the drive shaft of a convenient form of motor, 50ª, which may be mounted on a truck and may be moved into and out of operative position as necessary. Suitable electrical connections may be provided conveniently located near the valve and when operation is desired by the portable motor the plug 121 is inserted and the collar 116 engaged with the enlargement 120, thus fixedly connecting the motor to the shaft 77.

It will thus be observed that a battery or group of valves may be installed and all arranged for manual operation by the provision of the chain wheel 96, and by embodiment therein of the device of Figure 6 the motor on the standard may be omitted in each case and a portable motor, either electrically or pneumatically operated, may be provided for operating the valve by power when desired or necessary.

Referring now to the structure of Figure 4, it will be observed that with the exception of some mechanical refinements this structure is substantially indentical with that of Figures 1 to 3, inclusive. For this reason the same reference characters have been applied to those parts which correspond to the same parts shown in Figures 1 to 3.

The principal structural differences between the device shown in Figure 4 and that of Figures 1 to 3 reside in the arrangement of the gear shaft 88, this shaft in this instance including a head portion 90, enlarged bearing portion, and a threaded end which threads into an opening, provided in the boss 94ª on the lower section 11, a set screw 93ª engaging said shaft 88ª for preventing its accidental rotation.

The additional feature of Figure 4 resides in the omission of the collar 83 and the arrangement of the yoke 100 so that its hub portion 100^b abuts the outer end of the bearing 78. In view of this arrangement it is necessary to elongate the hub 96^b of the chain wheel 96 so as to abut the hub portion 100^b.

As the operation of the device of Figure 4 and the advantages accruing thereto are substantially the same as those hereinbefore set forth in connection with the device of Figures 1 to 3, a repetition of the same will not be made. It will be readily understood that the shaft 77 of Figure 4 may be conveniently provided with the modification shown in Figure 6.

From the foregoing it will be appreciated that a compact and substantially unitary power and manual operating means for valves and other similar mechanisms is provided and is possessed of a high degree of utility and flexibility in operation. For instance, I have provided means whereby a valve may be operated by a motor mounted on the operating mechanism itself, and, in this arrangement, means whereby the device may be manually operated, and additionally, either as an alternative or as an auxiliary arrangement, I have provided means whereby the valve may be operated by a portable motor, pneumatic, electrical or othewise.

Referring now to Figure 7, it will be obvious that a wheel 124, having hand spokes 125, and commonly known as a pilot wheel, such as is shown in my co-pending application, Serial No. 541,620, may be substituted for the chain wheel 96, the wheel 124 having its hub portion 126 provided with the same kind of clutch elements carried by the chain wheel 96. The shaft 77 in Figure 7 is also provided with the connection 127 to a motor, portable or otherwise.

Having thus described my invention and illustrated its use, what I claim as new and desire to secure by Letters Patent is:

1. In a motion transmitting unit, in combination, an element to be moved, mechanism for effecting movement of said element, manually operable means for actuating said element, auxiliary manual operating means permanently carried upon as a part of said unit, means for disconnectibly connecting said auxiliary manual operating means to a source of power, gearing for increasing the leverage of said auxiliary manual operating means, and means for disconnectibly connecting said auxiliary manual operating means with said gearing for effecting movement of the element to be moved.

2. In a power transmission mechanism, a valve mechanism, motion transmitting mechanism connected thereto for moving said valve on and off its seat, manually operable means including a laterally extending shaft and a wheel thereon for moving said motion transmitting mechanism, directly to the shaft of said manual operating means and clutch means on said shaft for disconnectibly connecting said manual means to said motion transmitting means whereby the valve may be started from its seat by the joint action of said manual means and motor and then driven solely by the motor by disconnection of said manual means.

3. In a power transmitting unit, a driven shaft, gearing operated by said shaft and connected to an element to be driven, a bearing for said shaft, a manually operated motion imparting element freely rotatable on said shaft adjacent to said bearing, a retaining member on said shaft for abutment with said motion imparting element, and a gear element on the opposite side of and abutting said bearing and affixed to said shaft for cooperation with said retaining member to maintain said shaft and motion imparting element in operative relationship to said gearing.

4. In a power transmitting unit, a driven shaft, gearing operated by said shaft and connected to an element to be driven, a bearing for said shaft, a manually operated motion imparting element freely rotatable on said shaft adjacent to said bearing, a retaining member on said shaft for abutment with said motion imparting element, a clutch element on said shaft for fixedly connecting said motion imparting element thereto, means on the outer end of said shaft for limiting the movement of said clutch element in one direction on said shaft, and a gear element on the opposite side of and abutting said bearing and affixed to said shaft for cooperation with said retaining member to maintain said shaft and motion imparting element in operative relationship to said gearing.

5. A power driven operating unit for valves and the like, including a standard having a housing including a movable part, manual operating means affixed to and movable with a part of said housing, valve operating mechanism in said housing, a motor carried by said standard and having driving connection with said operating mechanism, an auxiliary manual valve operating device connected by a reduction gearing to the movable part of said manual valve operating device having a hand wheel for disconnectible connection therewith and means for disconnectibly connecting said auxiliary manual operating means to a motor, whereby the valve may be started from its seat jointly by manipulation of said manual means and said motor and then driven solely by the motor by disconnection of said manual means.

In testimony whereof I have hereunto signed my name.

EMORY T. SMITH.